US006400103B1

(12) United States Patent
Adamson (10) Patent No.: US 6,400,103 B1
(45) Date of Patent: Jun. 4, 2002

(54) NETWORKABLE POWER CONTROLLER

(75) Inventor: Hugh Patrick Adamson, Boulder, CO (US)

(73) Assignee: Power Circuit Innovations, Inc., Boulder, CO (US)

( * ) Notice: Subject to any disclaimer, the term of this patent is extended or adjusted under 35 U.S.C. 154(b) by 0 days.

(21) Appl. No.: 09/522,390

(22) Filed: Mar. 10, 2000

Related U.S. Application Data (60) Provisional application No. 60/123,899, filed on Mar. 11, 1999.

(51) Int. Cl.[7] ............................................. H05B 37/02
(52) U.S. Cl. ...................... 315/292; 315/294; 315/312; 315/320
(58) Field of Search ................................ 315/292–296, 315/312, 314, 316, 318, 320, 324, 291, 360, 362, DIG. 4, 240

(56) References Cited

U.S. PATENT DOCUMENTS

| | | | | |
|---|---|---|---|---|
| 3,691,404 A | * | 9/1972 | Swygert, Jr. | 315/292 |
| 5,933,340 A | | 8/1999 | Adamson | 363/97 |
| 6,011,329 A | * | 1/2000 | McGovern | 315/320 |
| 6,072,282 A | | 6/2000 | Adamson | 315/276 |
| 6,138,241 A | * | 10/2000 | Eckel et al. | 315/320 |

OTHER PUBLICATIONS

Rotary Dimmer Model: DR1 Specifications; Apr. 13, 1999; http://www.elinet.com/dr1s.htm , Electronic Lighting Incorporated. 1998.
DayWatt Photosensor Model: PS1 Specifications; Apr. 13, 1999; http://www.elinet.com/ps1.htm ; Electronic Lightign-Incorporated. 1998.
Products List; Mar. 6, 2000. http://www.elinet.com/products.htm; Electronic Lighting Incorporated. 1998.
Envoy Lighting Load Controller; Jan. 24, 2000. http://www.elinet.com/Is3.htm; Electronic Lighting Incorporated. 1998.
QuickLink Harness Model: WH024–MS Specifications; Apr. 13, 1999. http://www.elinet.com/q1spec2.htm; Electronic Lighting Incorporated. 1998.
QuickLink Harness Models WH104–MM & WH104–MF Specifications; Apr. 13, 1999. http://www.elinet.com/q1spec.htm; Electronic Lighting Incorporated. 1998.
LonWorks Core Technology, *ANSI Ratified the Underlying Protocol of LonWorks Networks as an official Standard*; ANSI/EIA 709.1–A–1999. Oct. 1999. http://www.echelon.com/products/Core/default/htm; Echelon Corporation. 2000.
The Development of BACnet; Goldschmidt P.E., Ira. Nov. 1998. http://www.bacnet.org/Bibliography/SPEE–11–98.html.

* cited by examiner

*Primary Examiner*—Don Wong
*Assistant Examiner*—Wilson Lee
(74) *Attorney, Agent, or Firm*—Merchant & Gould P.C.

(57) ABSTRACT

A networkable power controller includes a mode selector for selectively conducting of a plurality of input signals to an output of the networkable power controller, where the input signals and the output signals satisfy the same signaling protocol. The networkable power controller may be networked with other networkable power controllers, lighting ballasts and other building automation control devices, and user-controlled voltage selectors to provide a lighting control network. A power controller may include a mode selector that may be used in combination with other control devices or components, including a rotary dimmer control, a digital slide dimmer control, a demand load shedder component, a photometer component, and a communications interface. The communications interface allows digital control of the networkable power controller.

16 Claims, 9 Drawing Sheets

NETWORKABLE POWER CONTROLLER

CROSS-REFERENCE TO RELATED APPLICATIONS

This application claims the benefit of U.S. Provisional Patent Application No. 60/123,899, filed Mar. 11, 1999, entitled "Networking Controls For Power Controlling Ballast".

The present application is also related to U.S. patent application Ser. No. 08/982,975, filed Dec. 2, 1997, entitled "Frequency Controlled, Quick and Soft Start Gas Discharge Lamp Ballast and Method Therefor" U.S. patent application Ser. No. 08/982,974, filed Dec. 2, 1997, entitled "Frequency Controller with Loosely Coupled Transformer Having A Shunt With A Gap And Method Therefor", and U.S. patent application Ser. No. 09/315,395, filed May 20, 1999, entitled "Light Sensing Dimming Control System for Gas Discharge Lamps".

TECHNICAL FIELD

The invention relates generally to building control systems, and more particularly to networkable power controllers used to control electrical or electro-mechanical systems in buildings.

BACKGROUND OF THE RELATED ART

A building control system generally allows a building operator to control a building system within one or more buildings, such as an HVAC system (heating, ventilation, and air conditioning system), a lighting system, a water and waste system, or a security system. For example, a building control system may include a centralized or remote building control station from which a building operator may configure thermostat setting schedules and monitor temperatures in various building zones. In this manner, a building operator can manage energy use and tenant comfort in accordance with the anticipated building usage during various hours of the day.

In addition, an open systems standard for building control system networks, called BACnet, has become an important standard in the building control industry. BACnet is a data communication protocol for building automation and control networks. Using BACnet, a building operator can control and monitor building-related devices distributed throughout a network in a building. Such BACnet-compliant device may include without limitation furnaces, air conditioning systems, cooling towers, heat exchangers, lighting systems, dampers, actuators, sensors, security cameras, and other building-related devices.

Modern building control systems, however, do not commonly accommodate personal overrides of the centrally controlled settings. As such, an employee working on a weekend may be left without adequate air conditioning on a hot summer day. Typically, the employee must contact a building operator at the central control station to change the temperature setting for his or her office. In addition, even with the cooperation of the central control station, many building control systems lack the precision to override the scheduled temperature settings on merely an individual office basis. Instead, the temperature setting of an entire zone or floor of the building is temporarily modified to accommodate the single employee's needs. Such imprecision diminishes the energy saving effect of the scheduled thermostat settings.

Individualized control of lighting systems and other building systems is also desirable, although not adequately addressed by existing solutions. For example, a building operator may schedule lighting on a floor in a building to be turned off (or turned down in intensity) after normal office hours to save energy. Without individual override control, an employee working late may be left in the dark and be unable to continue working without contacting the building operator to turn the lights back on.

Furthermore, it is not uncommon for large energy consumers, such as a grocery store operator, to negotiate for lower rates from a utility company in exchange for shedding its energy at the utility's request. That is, if the building operator is willing to reduce its energy consumption at the request of the utility during peak demand periods (e.g., a hot summer day), the utility will charge the building operator lower overall rates for its energy consumption. For example, at a utility's request, a grocery store may reduce the light intensity in the store gradually over a period of time. Patrons and employees tend to automatically acclimate to the slowly decreasing light intensity, without being aware of the change.

However, a conventional method for achieving such a demand reduction involves a store manager going from light switch to light switch, incrementally reducing the light intensity of various lights and/or lighting zones until the lighting throughout the store has been reduced to the appropriate level. After the demand shedding period is over, the store manager typically repeats this time-consuming process in reverse, gradually increasing the light intensity to its normal level.

In addition, existing lighting control systems typically entail considerable costs and provide, limited flexibility in configuring and powering a control network. A problem exists in providing an inexpensive network of lighting subsystems that can be installed easily throughout a building and powered conveniently by an available energy source, while providing flexible control from a central or remote control station with the convenience of individual overrides.

SUMMARY OF THE INVENTION

The above and other problems are solved by a networkable power controller that can conduct control signals for controlling an electrical device, such as a ballast of a lighting device, a BACnet device, etc. The networkable power controller can include multiple inputs, an output, and a mode selector that selects a control signal received at one of the inputs to be conducted to the output. The inputs and the output support the same signaling protocols so that multiple power controllers may be coupled together to form a network. That is, the output signal of one power controller, which is configured in accordance with the input signals and the mode selector, may be used as an input signal of a subsequent power controller. The output control signal can be used to control the power provided to or by a building automation control device in a building, including a lighting ballast or a BACnet device. Alternatively, the output control signal may control the operation of the building automation control device without directly controlling the power provided to or by the device, such as by including an analog or digital signal that causes the device to internally alter building automation control device's consumption or generation of power.

In addition, a power controller may be powered by power received from one or more ballasts coupled to its output. In one embodiment, the power is derived from a winding in the power factor circuit of the ballast and passed into the lighting controller through its output port. A power bus in the power controller transfers the power, received at the controller's output port, to a preceding device, such as a rotary light dimmer control, a demand load shedder, or another lighting controller.

In one aspect of the present invention, a lighting controller, which is an example of a power controller, that controls at least one ballast driving a lighting device is provided. An output signal line of the lighting controller is adapted to output an output signal satisfying a signaling protocol. The signaling protocol defining a signal format for driving the ballast. A first input signal line is adapted to receive a first input signal satisfying the signaling protocol. A second input signal line is adapted to receive a second input signal satisfying the signaling protocol. A mode selector selects among a plurality of modes, each mode determining which of the first input signal and the second input signal are conducted to the output signal line.

In another aspect of the present invention, a method for networking a power controller that controls at least one ballast driving a lighting device is provided, The power controller includes an output signal line adapted to output an output signal, a first input signal line adapted to receive a first input signal, and a second input signal line adapted to receive a second input signal. The output signal, the first input signal, and the second input signal satisfy the same signaling protocol. An output of an additional power controller is coupled to the first input signal line of the power controller. A user controllable voltage selector is coupled to the second input signal line of the power controller. A given mode is selected from among a plurality of modes. Each mode determines which of the first input signal and the second input signal are conducted to the output signal line.

DETAILED DESCRIPTION OF EMBODIMENTS OF THE INVENTION

A networkable power controller includes a mode selector for selectively conducting one of a plurality of input signals to an output of the networkable power controller, where the input signals and the output signals satisfy the same signaling protocol. The networkable power controller may be networked with other networkable power controllers, lighting ballasts, and user-controlled voltage selectors to provide a lighting control network. A power controller can include a mode selector that may be used in combination with other control devices or components, including a rotary dimmer control, a digital slide dimmer control, a demand load shedder component, a photometer component, and a communications interface, to provide a number of flexible embodiments of the present invention.

Figure 1:
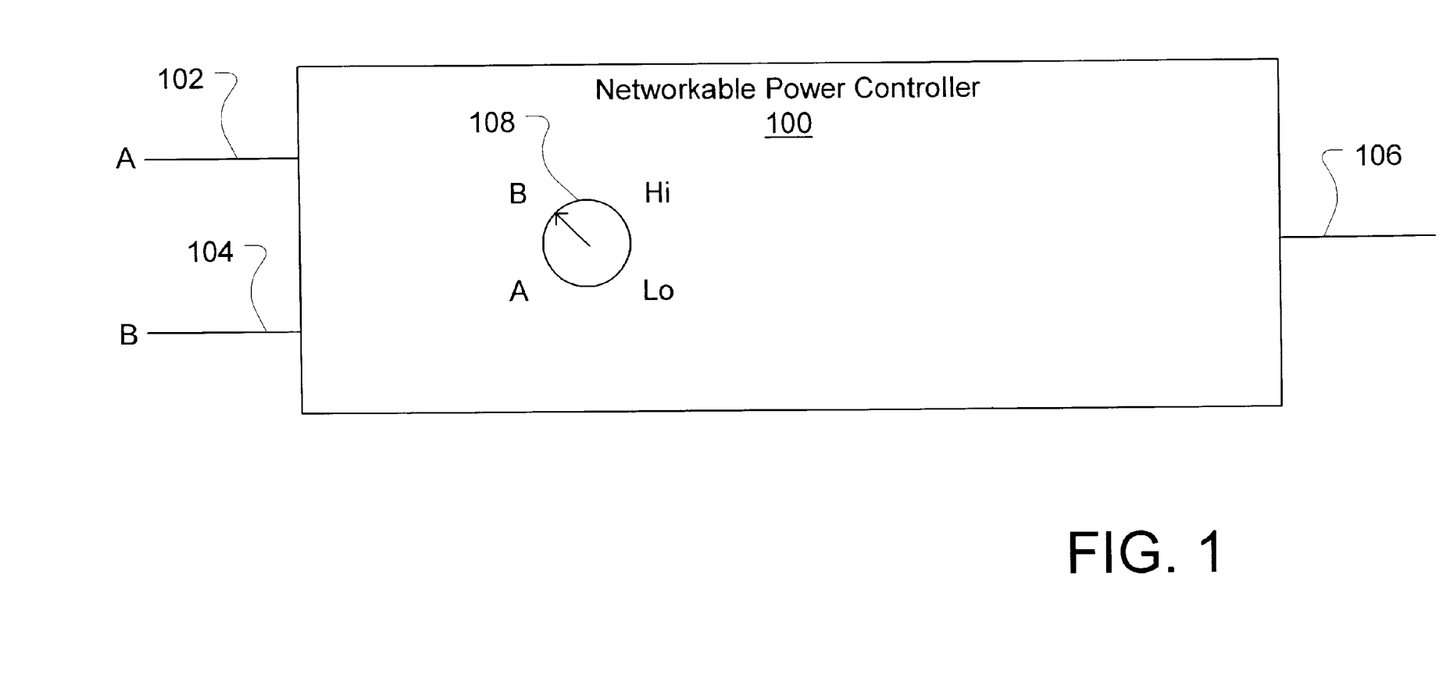
FIG. 1 illustrates inputs and output of a power controller.

FIG. 1 illustrates an embodiment of a power controller. A power controller 100 includes two analog inputs 102 and 104 and an analog output 106. The output 106 is adapted to control a driver device designed to drive or provide power to an electrical device or an electromechanical device, such as a lighting device or another building automation control device. One example of a driver device is a ballast of a lighting device, such as a fluorescent light or other gas discharge light. An alternative example of a driver device is a power supply control circuit for driving a building automation control device, such as a BACnet-compatible device.

The two inputs and the output support the same signaling protocol, namely a 0.8 volt DC to 8 volt DC voltage control signal, for controlling a ballast that drives a lighting device. In alternative embodiments, other signaling protocols, including without limitation a 2 volt to 8 volt signal, a 0 volt to 12 volt signal, and a 0 volt to 10 volt signal, are contemplated within the scope of the present invention. Alternative signal protocols, such as signaling protocols for a BACnet interface, may also be employed to define control signals to control a lighting ballast, HVAC equipment, security systems, etc., depending on the input requirements of the component devices.

The common signaling format between inputs and outputs of the multiple power controllers 100 allows each controller to be networked with other controllers. For example, the output 106 can be coupled to the input of a subsequent power controller (not shown) to extend the functionality of a single power controller into a network of controllers. As such, multiple controllers may be combined in a network to control many lighting devices throughout a building.

The mode selector 108 allows a user, a building operator or a building control system to configure the operation of the power controller and, therefore, configure the operation of a given node in a network. In the illustrated embodiment, a rotary switch allows a user to select from among four configuration options or selection modes, as shown in Table 1 with the criterion for each mode.

TABLE 1

| Mode | Description of Criteria |
|---|---|
| A | The signal at input A is conducted to the output 106 |
| B | The signal at input B is conducted to the output 106 |
| HI | The signal of either input A or input B having the highest signal level (e.g., voltage level) is conducted to the output 106 |
| LO | The signal of either input A or input B having the lowest signal level (e.g. voltage level) is conducted to the output 106 |

In alternative embodiments of the present invention, other user or system switchable devices may be employed as a mode selector, including buttons, sliders, keypads, programmed computers and other input devices. Furthermore, alternative embodiments of the present invention may have more or less than four modes from which a user may select a desired mode. For example, an embodiment of the present invention may provide more than two inputs similar to inputs A and B, and therefore a mode selector may include mode selections for each of the additional inputs as well as selections for other criterion-related modes (e.g., the HI and LO selections). Additional examples of alternative criterion-related modes include a mode that combines the two input signals in some way. For example, modes might include a mode that splits the difference between two input signal levels, a mode that averages multiple signal levels, a timed mode that conducts the input signal of one input to the output 106 for a period of time and then switches to conduct the signal of an alternate input to the output 106 for another period of time.

The signaling protocol in one embodiment of the present invention as a power controller provides a control signal to a frequency controlled dimming ballast which controls the power consumption of a gas discharge lamp by adjusting the electrical power applied to the gas discharge lamp in response to the control signal. The frequency controlled dimming ballast uses a loosely-coupled transformer that controls the conduction of current to the gas discharge lamp in response to an oscillating driving signal. A more detailed discussion of a frequency controlled dimming ballast may be found in U.S. patent application Ser. Nos. 08/982,975, filed Dec. 2, 1997, entitled "Frequency Controlled, Quick and Soft Start Gas Discharge Lamp Ballast and Method Therefor" and U.S. patent application Ser. No. 08/982,974, filed Dec. 2, 1997, entitled "Frequency Controller with Loosely Coupled Transformer Having A Shunt With A Gap And Method Therefor", incorporated herein by reference for all that they disclose and teach. Ballasts other than those described in the related patents may be used with the controllers in the present invention.

Figure 2:
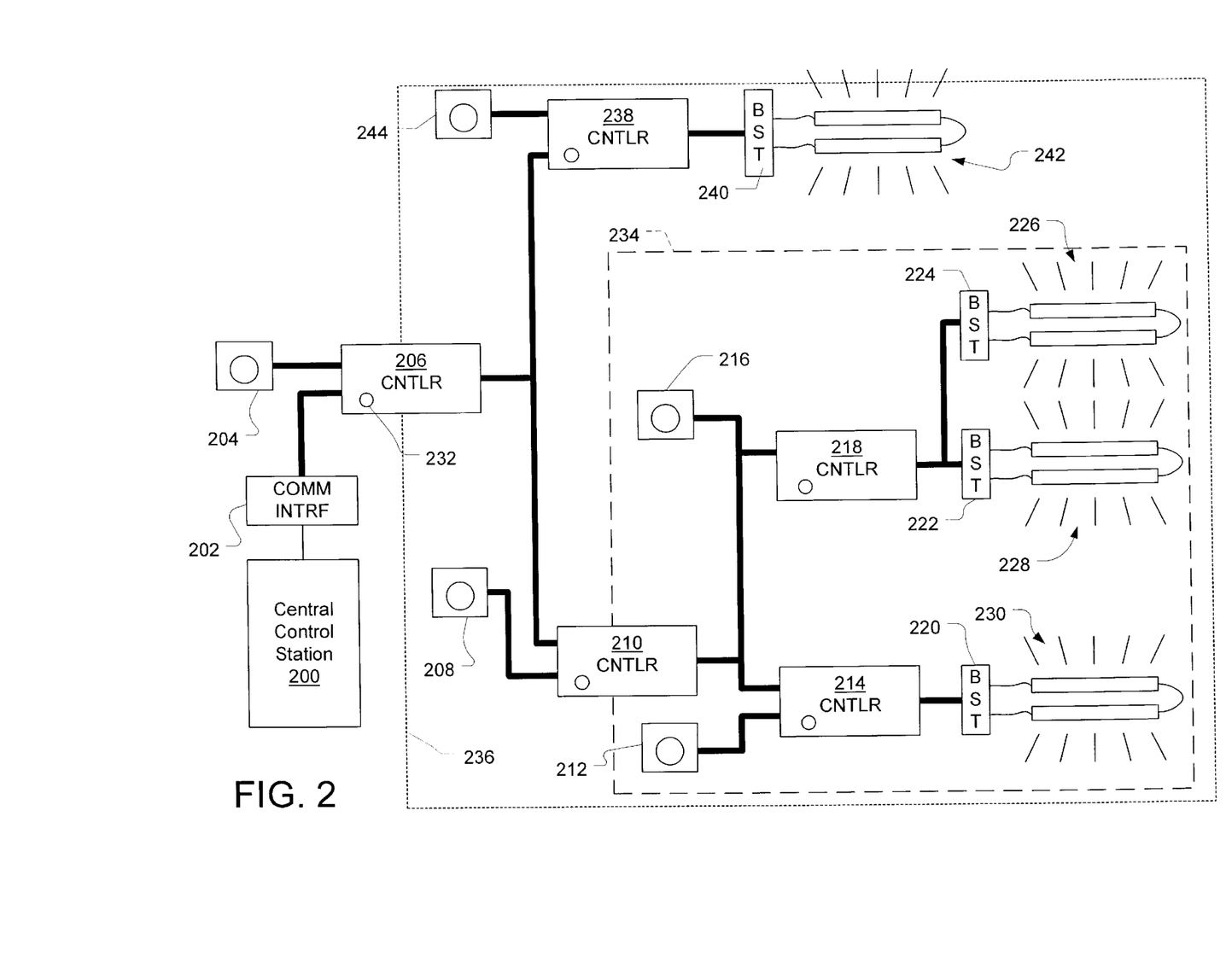
FIG. 2 illustrates an exemplary network of lighting controllers in an embodiment of the present invention.

FIG. 2 illustrates a network of lighting controllers, which are exemplary power controllers, in one embodiment of the present invention. It should be understood that alternative network topologies may be configured without departing from the present invention. A central control station 200 communicates a digital signal to and from a communications interface 202. The central control station 200 can generate commands to control a lighting device, such as lighting devices 226, 228 and 230. The illustrated embodiment shows a typical fluorescent lamp 226 including two gas discharge bulbs coupled in series to a ballast 224 (BST). It should be understood that the fluorescent lamp 226 is illustrated as a lighting device in an exemplary embodiment of the present invention and that alternative lighting devices, including other gas discharge lamps, may be employed within the scope of the present invention. Examples of alternative lighting devices include high intensity discharge (HID) lamps, sodium lamps, and neon lamps.

The communications interface 202 (COMM INTRF) converts the digital signal from the central control station 200 into an analog control signal that satisfies the signaling protocol of the lighting controller 206. A rotary dimmer control 204 is coupled to a second input of the lighting controller 206 (CNTLR). The lighting controller 206 is coupled to an input of another lighting controller 210. Another rotary potentiometer control 208 is also coupled to the lighting controller 210. The lighting controllers may be cascaded together in a network to extend selectability and control of lighting devices distributed throughout a building.

The lighting controllers in a network may be viewed as controllable nodes in the network. Each controller according to its mode selection passes or gates a local or remote control signal to the next controller or output power device downstream from the controller.

For example, if lighting controller 210 is mode selected to receive a local control signal from dimmer 208, than that local control signal will be passed as the remote control signal input to controllers 214 and 218. In this way, the effect of a local control signal at a controller becomes the remote control signal to controllers connected downstream from that controller. Of course the downstream controllers may be mode selected to use their own local control signal, the remote control signal or a logical choice of either depending upon the mode selector.

In FIG. 2, the output port of controller 206 is connected to an input port of controllers 210 and 238. Lighting controller 210 in the network is a node at the entry to a sub-network or zone 234 of the network. This sub-network includes controllers 218 and 214, ballasts 220, 222 and 224, and lamps 226, 228 and 230. Lighting controller 218 controls two ballasts 222 and 224, where each ballast drives lamps 228 and 226 respectively. Lighting controller 214 controls ballast 220 which drives lamp 230. The remote control signal for this sub-network 234 would come from controller 210, controller 206 or central control station 200 (converted via interface 202) depending upon the mode settings in controllers 206 and 210. Outside zone 234, lighting controller 238 controls ballast 240 which drives lamp 242. Controller 238 may receive a local control signal from dimmer 244 or a remote control signal from controller 206 or central control station 200.

When the network is viewed at a building or site level, the illustrated embodiment of FIG. 2 represents an exemplary configuration of a building's lighting controller network. The central control station 200, through the communications interface 202, provides an input control signal to the lighting controller 206. Likewise, the rotary control 204 also provides an input control signal to the lighting controller 206. Depending on the setting of the mode selector 232, one or the other of the input signals is conducted to one of the inputs of the lighting controller 210. For example, the rotary control 204 may represent an emergency lighting switch, which is intended to turn all the lights in a building or zone up (i.e., to a higher illumination level) in an emergency. In contrast, the central control station 200 may provide scheduled illumination changes throughout the day or week (e.g., after midnight, the lights in the building are dimmed to a minimal level). Accordingly, in an emergency, the rotary control 204 may be turned up to full intensity in order to turn up all the lights in the building. As such, the mode selector 232 in the lighting controllers 206, 210, 238, 214 and 218 are set to conduct the control signal having the highest signal level to the output of the lighting controller 206. In this fashion, the rotary control 204 overrides the scheduled setting of the central control station 200 and brings up the lights in the building.

In an alternative embodiment, an inverse polarity relationship, exists between the control signal and the light intensity of a lighting device. Therefore, the rotary control 204 would input a low signal level and the mode selector 232 would be set to conduct the lowest signal to its output in order to increase the light intensity in a building. The rotary control 208 is an override control coupled to the lighting controller 210. Other modes may include timed modes, which switch to other modes after a predetermined period of time, and averaging modes, which output the average or one or more input signal levels.

With the mode selector in controllers 210, 214 and 218 set to pass the highest signal level (i.e., corresponding to the highest light intensity level) the rotary control 208 may be used to increase the illumination in a given zone 234, overriding the remote control signal output from the lighting controller 206. Alternatively, the lighting controller 210 may be set to pass strictly one or the other of the input signals or the input signal having the lowest level.

In a similar fashion, the rotary control 244 may be used, depending on the mode selector setting, to override the input signal from the lighting controller 206 to the lighting controller 238. For example, the lamp 242 may represent a lamp over an individual work area. The lamp 242 is powered and controlled by way of the ballast 240. If the mode selector of the lighting controller 238 is set appropriately, the individual worker can override an energy saving signal from the central control station 200 merely by increasing the illumination at the rotary control 244. In this manner, the worker can maintain a desired illumination level, while the building operator maintains energy savings throughout the rest of the building.

In an embodiment of the present invention, each ballast is powered by conventional AC power source and has its own power supply or power factor circuit to generate DC power. The power factor circuit includes a winding and circuitry from which DC power is derived to auxiliary DC power outside the ballast. An example of a ballast providing auxiliary DC power outside the ballast may be found U.S. Pat. No. 5,933,340, issued Aug. 3, 1999, entitled "Frequency Controller with Loosely Coupled Transformer Having A Shunt With A Gap And Method Therefor", As will be described in FIG. 3, the auxiliary power from the ballast may be passed back to and through the cascading controllers preceding the ballast in the network to power the controllers and devices connected to the controllers.

Figure 3:
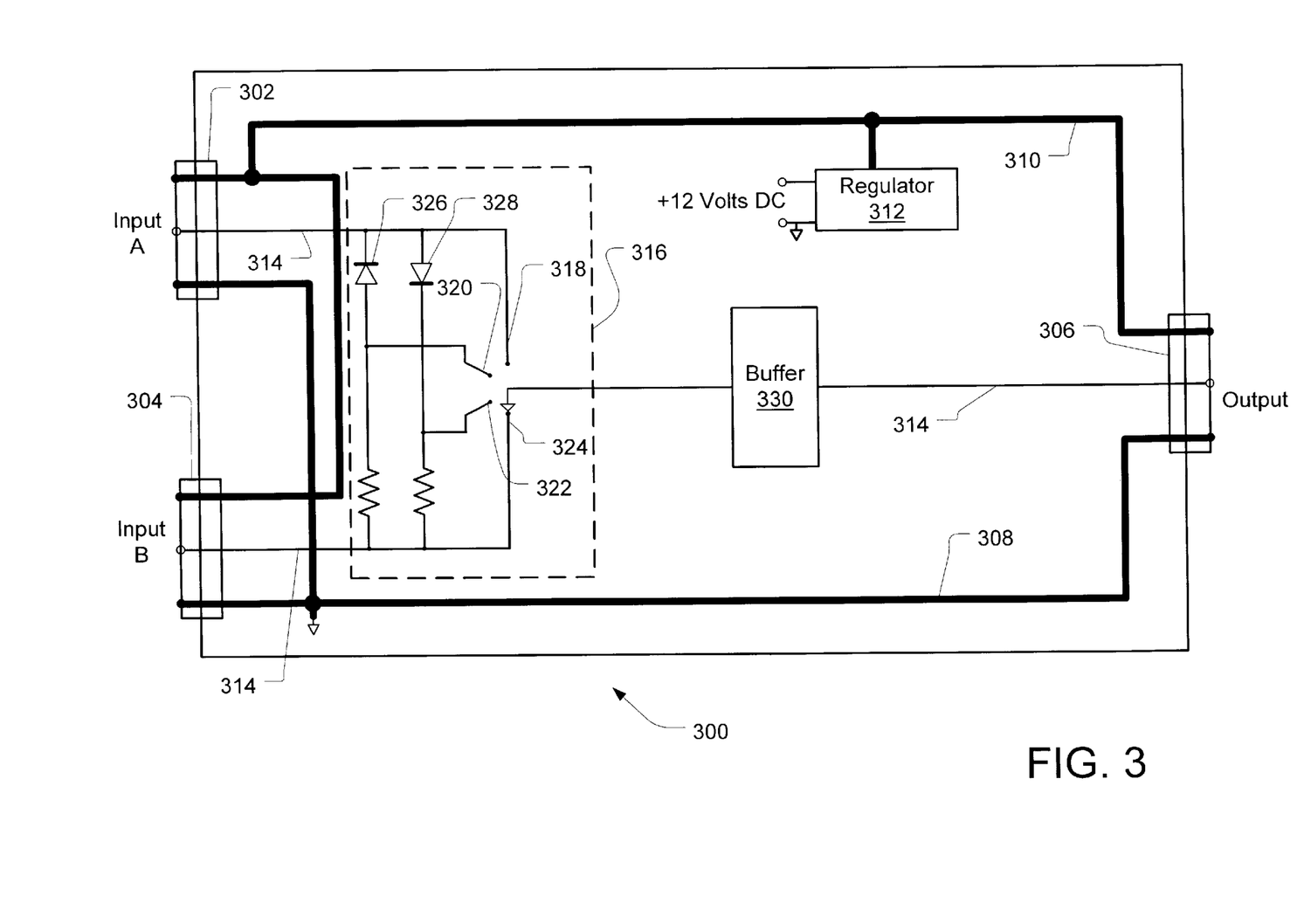
FIG. 3 depicts a logical representation for an embodiment of the power controller.

FIG. 3 depicts a logical representation for a power controller in one embodiment of the present invention. Power controller 300 includes three ports: Input A port 302, Input B port 304, and Output port 306. In an alternative embodiment, additional ports may be included in the power controller. Each port includes three leads: a power lead, a ground lead, and a signal lead. An input port is used to couple the controller 300 to a preceding controller or another control device, such as user-controlled voltage selector, providing a local control signal. In addition, an output port may be coupled to a succeeding controller or a driving device, such as a ballast.

A power bus in controller 300 consists of a power line 310 and a ground line 308. The power bus transfers power from the output port 306 through the controller to the input ports 302 and 304. In this manner, power provided to the controller 300 (e.g., by a ballast or by a ballast through a controller) is transferred to power all other controllers or local devices (e.g., rotary controls, communications interfaces, and other devices connected to the controllers) in the network. For example, in FIG. 2 auxiliary DC power from ballasts 220, 222, 224 and 240 is effectively connected in parallel to and through controllers 206, 210, 214, 218 238, control devices 204, 208, 212, 216, and 244, and communication interface 202. The combination of power lines, ground lines and control lines are indicated in FIG. 2 as thick black lines.

The controller 300 includes a voltage regulator 312 coupled to the power line 310 to provide a regulated DC voltage to power the controller itself. In an embodiment of the present invention, the internal power generated by the regulator 312 is a positive 12 volts DC; however, other internal power levels are contemplated within the scope of the present invention.

Each of the ports has a signal line 314. The signal line is designated to support a single signaling protocol for both inputs and outputs. In one embodiment and present invention, the signaling protocol defines an analog control signal from zero to 12 volts DC. Note that only a signal range of 3 through 8 volts is needed to control the illumination through a typical ballast; however, a larger range is supported to allow customization of control signals using other voltage levels, such as to support a BACnet-compliant device. A buffer amplifier 330 amplifies and isolates the output signal from the input and drives a control signal out to a subsequent power controller or ballast.

A mode selector 316 allows the leading controller to be configured for a given mode of operation. In an embodiment of present invention, each mode of operation determines which input signal is to be logically gated to the output port for passage as a gated control signal to a next controller or power device. A mode associated with selector lead 318 gates the signal from the Input A to the output port 306. A mode associated with selector lead 324 gates the signal from the Input B to the output port 306.

The mode associated with selector lead 320 logically gates the input signal having the lowest signal level to the output port 306. In this mode, if the Input A signal has the lowest signal level, the diode 326 is forward-biased, pulling the voltage of lead 320 to the signal level of the Input A signal. However, if the Input A signal has the highest signal level, the diode 326 is reverse-biased, pulling the voltage of lead 320 to the signal level of the Input B signal.

The mode associated with selector lead 322 propagates the input signal having the lowest signal level to the output port 306. In this mode, if the Input A signal has the highest signal level, the diode 328 is forward-biased, pulling the voltage of lead 322 to the signal level of the Input A signal. However, if the Input A signal has the lowest signal level, the diode 328 is reverse-biased, pulling the voltage of lead 322 to the signal level of the Input B signal.

In the illustrated embodiment, the mode selector 316 is shown as a rotary switch with logic circuit—diodes 326 and 328 and associated resistors—coupling an output signal line to one of four possible input signal lines. In alternative embodiments, however, a different type of mode selector may be employed, such as a multi-button selector (e.g., one button for each mode), a keypad, a slider control or a micro-controller as described hereinafter in FIG. 8. Furthermore, a mode selector capable of selecting between more than two inputs is contemplated within the scope of the present invention. In yet another alternative embodiment, the mode selector may also couple an input signal line to one of a plurality of output signal lines.

The power controller of FIG. 3 may be combined with other devices, such as ports, a user-controlled voltage selectors, and other analog and digital circuitry, to form a more complex device. FIGS. 4 through 8 illustrate exemplary embodiments of such complex devices in accordance with other embodiments of the present invention.

Figure 4:
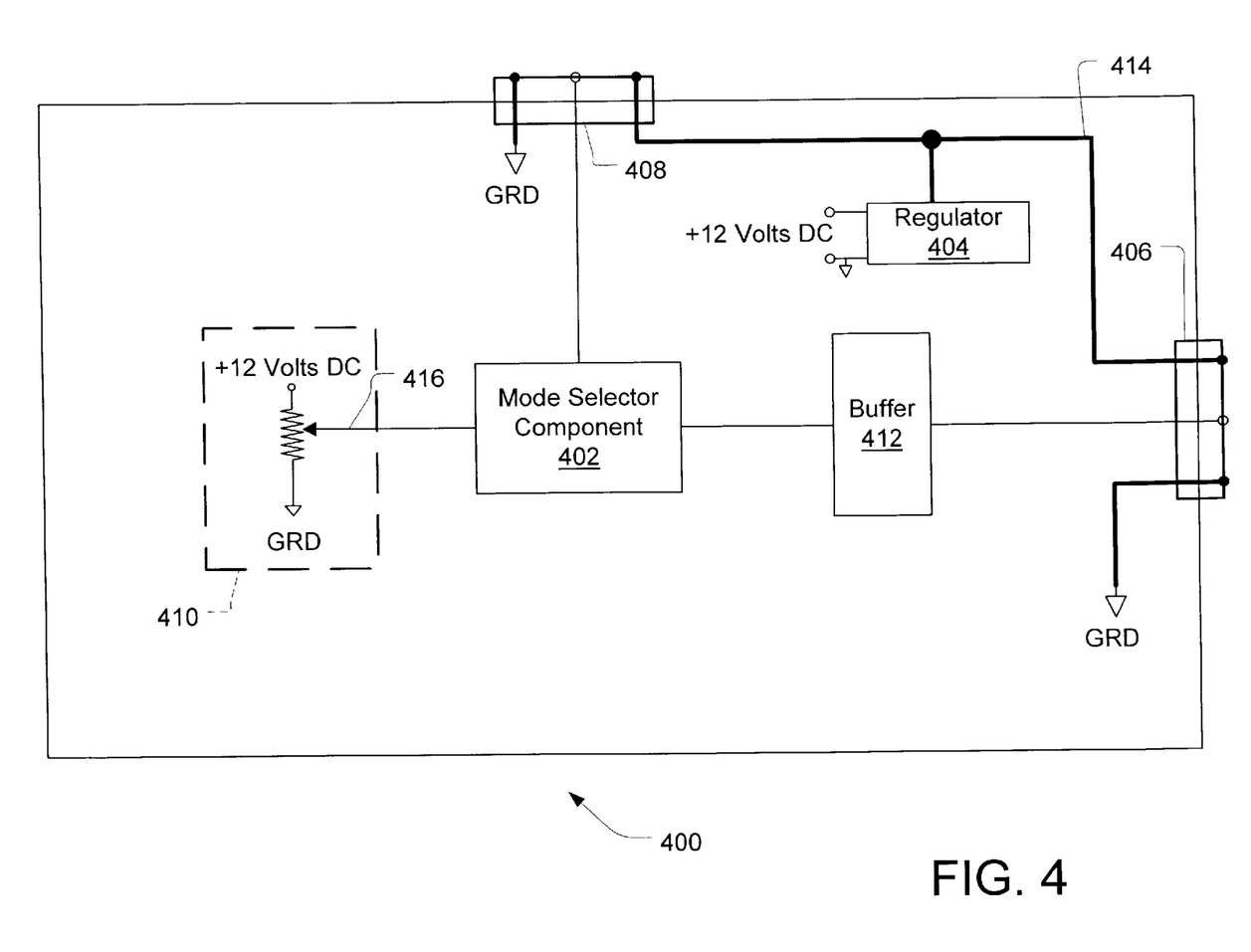
FIG. 4 depicts an exemplary logical representation for an embodiment of the present invention that includes a rotary potentiometer.

FIG. 4 depicts an exemplary logical representation for an embodiment of the present invention that includes a rotary potentiometer as a user-controlled voltage selector. A rotary dimmer device 400 includes a rotary potentiometer 410 and a mode selector 402. A buffer 412 amplifies and isolates the output signal to satisfy the signaling protocol and to drive a subsequent power controller or ballast.

The rotary potentiometer 410 is powered by an internal source voltage output from a regulator 404, which receives current from a power bus 414. The output signal of the rotary potentiometer 410 is conducted to one of the inputs (e.g., Input A) of the mode selector 402. As such, the rotary potentiometer 410 may be rotated by user to alter the input voltage to the mode selector 402. Although a rotary potentiometer is illustrated and described with regard to FIG. 4, other types of potentiometers may be employed to select an input voltage in accordance with the present invention, including a sliding potentiometer.

An input port 408 is adapted to receive a second input signal to the mode selector 402. Using the input port 408, a preceding mode selector, user-controlled voltage selector, or other control device may be coupled to the rotary dimmer device 400 to configure a power controller network. Depending on the mode selector setting in the mode selector 402, the input voltage of the rotary potentiometer 410 may be conducted to the output port 406 of the rotary dimmer device 400 to control a ballast or to provide an input signal to a subsequent mode selector. In an alternate mode setting, the control signal received via the input port 408 may be conducted to the output port 406 of the rotary dimmer device 400.

Figure 5:
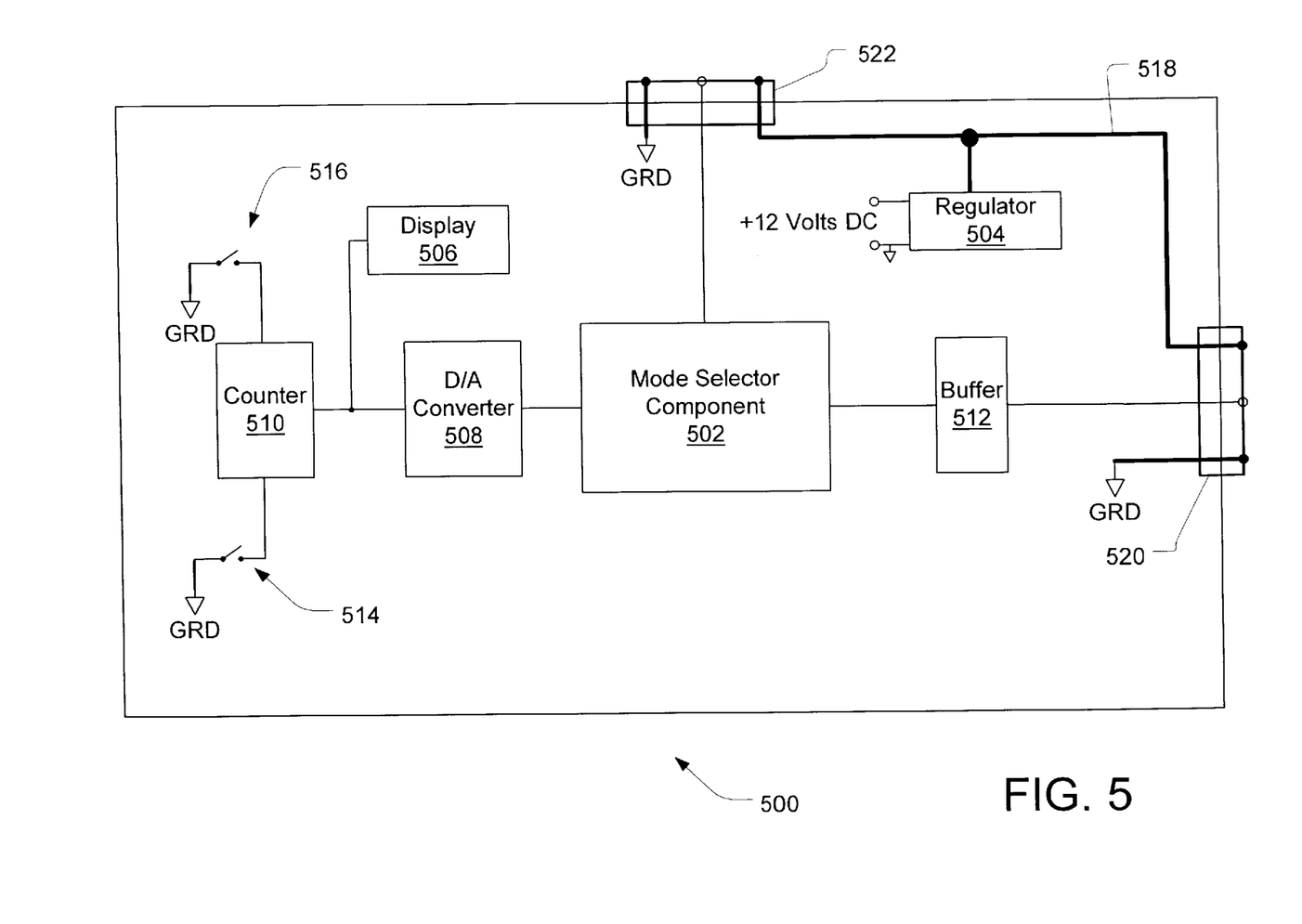
FIG. 5 depicts an exemplary logical representation for an embodiment of the present invention that includes a digital slide dimmer.

FIG. 5 depicts an exemplary logical representation for an embodiment of the present invention that includes a digital slide dimmer as a controlled voltage selector. A digital slide dimmer device 500 includes a digital counter 510, a digital-to-analog converter 508, and a mode selector 502. A buffer 512 amplifies and isolates the output signal of the mode selector 502 to satisfy the signaling protocol and to drive a subsequent power controller or ballast.

The logic within the digital slide dimmer device 500 is powered by internal source voltage output from a regulator 504, which receives current from a power bus 518. The counter 510 increments while a switch 516 is closed and decrements while a switch 514 is closed. The switches 514 and 516 may be controlled, for example, by a user-controlled slide control that closes the switch 516 when it is moved in one direction and closes the switch 514 when it is move in the opposite direction. The output of the counter 510 is a digital signal representing the current value of the counter 510. This digital signal is received by the digital-to-analog converter 508 and converted into an analog voltage signal, which is conducted to one of the inputs (e.g., Input A) of the mode selector 502. A display 506 provides a user-observable indication of the current value of the counter 510, such as by way of a numeric LED (Light Emitting Diode) display or LCD (Liquid Crystal Display). Although a digital slide dimmer is illustrated and described with regard to FIG. 5, other types of the digital controls and digital voltage selectors may be employed to select an input voltage in accordance with the present invention, such as a keypad or a rocker switch.

In an alternative embodiment, a time may also be included in the logic of the digital slide dimmer 500 to gradually modify the control signal over a predetermined period of time. For example, when a building operator decreases the digital slide dimmer setting, the illumination controlled by the digital slide dimmer 500 decreases to the newly set level over a period of 5 seconds, based on the setting of the timer.

An input port 522 is adapted to receive a second input signal to the mode selector 502. Using the input port 522, a preceding mode selector, user-controlled voltage selector, or other control device may be coupled to the digital slide dimmer device 500 to configure a power controller network. Depending on the mode selector setting in the mode selector 502, the input voltage generated by the digital-to-analog converter 508 may be conducted to the output port 520 of the digital slide dimmer device 500 to control a ballast or to provide an input signal to a subsequent mode selector. In an alternate mode setting, the control signal received via the input port 522 may be conducted to the output port 520 of the digital slide dimmer 500.

Figure 6:
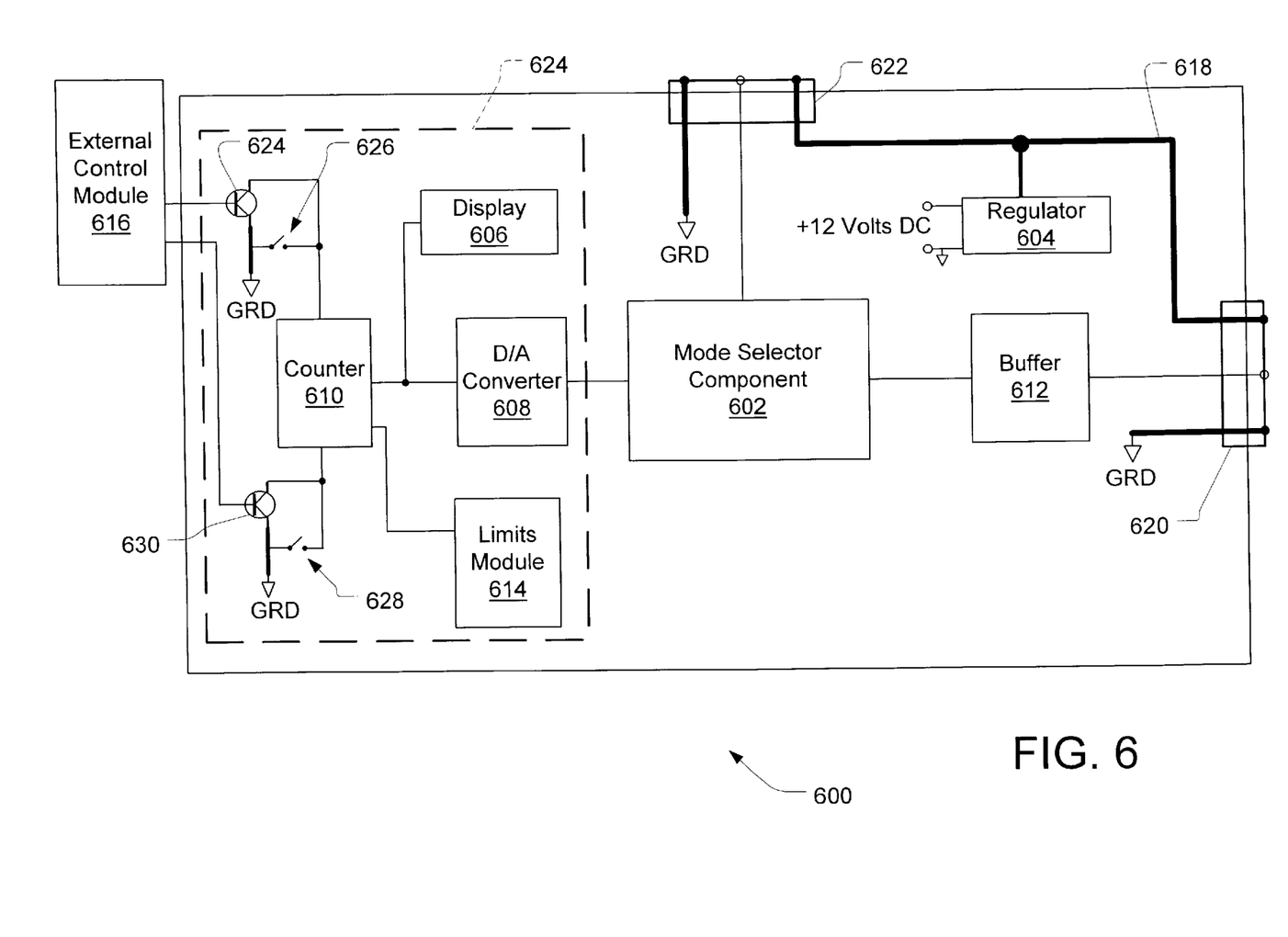
FIG. 6 depicts an exemplary logical representation for an embodiment of the present invention that includes a demand load shedder.

FIG. 6 depicts an exemplary logical representation for an embodiment of the present invention that includes a demand load shedder as a controlled voltage selector. A demand load shedder device 600 includes a digital counter 610, a digital-to-analog converter 608, and a mode selector 602. A buffer amplifier 612 amplifies and isolates the output signal of the mode selector 602 to satisfy the signaling protocol and to drive a subsequent power controller or ballast.

Furthermore, in one embodiment of the present invention, an external control module 616 may be connected to the demand load shedder device 600 to provide external control means. For example, the external control module 616 may be coupled to a TCP/IP client. The client may receive a command (e.g., in the form of email from a utility) to decrease energy consumption. The external control module 616 can then trigger the demand load shedder device 600 to decrease its output signal, thereby decreasing illumination and energy consumption gradually to a predefined level (e.g., 70% of normal illumination). In addition, in response to another command signal indicating that the decrease in consumption is no longer required, the external control module 616 can then trigger the return to the normal illumination level. In an alternative embodiment, the external control module 616 can monitor the voltage and current entering a building. If the energy consumption reaches a predetermined threshold, the external control module 616 triggers the demand load shedder device to decrease the illumination gradually to a predefined level, at least until the excessive consumption is over.

The logic within the demand load shedder device 600 is powered by internal source voltage output from a regulator 604, which receives current from a power bus 618. Within the limits set by the limits module 614, the counter 610 increments while a load selector switch 626 is closed (or a transistor 624 is on) and decrements while a load selector switch 628 is closed (or a transistor 630 is on). In the illustrated embodiment, two buttons (not shown) are used to control the load selector switches 626 and 628. The load selector switch 626 corresponds to a voltage which is a load shedder control signal level indicating a normal illumination level, as set in the limits module 614. The load selector switch 628 corresponds to a voltage, which is a load shedder control signal level indicating an illumination level at 70% of normal, as set in the limits module 614. When the switch 626 is closed, the voltage gradually decreases (e.g., over a period of 5 minutes) from its normal setting to a voltage setting that indicates the decrease to 70% of normal illumination. The time period of the gradual decrease may be controlled by a settable timer or clock rate module in the counter 610. In an alternative embodiment, the high and low limits may be set to alternative values. For example, the high limit may be set to less than 100% of normal illumination and the low limit may be set to provide more or less than 70% of normal illumination. Alternative embodiments providing more than two illumination settings are also contemplated in accordance with the present invention.

The load selector switches 626 and 628 may each be controlled, for example, by a controlled button that close one of the corresponding load selector switches when depressed. Alternatively, the counter 610 may be incremented or decremented by the controls, such as a three-position rocker switch (increment, decrement, neutral), a rotary control, or the external control module 616, which is designed to increment the counter 610 by turning on the transistor 624 (and turning off the transistor 630) and to decrement the counter 610 by turning on the transistor 630 (and turning off the transistor 624). The output of the counter 610 is a digital signal representing the current value of the counter 610. This digital signal is received by the digital-to-analog converter 508 and converted into an analog voltage signal, which is conducted to one of the inputs (e.g., Input A) of the mode selector 602. A display 606 provides a user-observable indication of the current value of the counter 610, such as by way of a numeric LED display or LCD.

An input port 622 is adapted to receive a second input signal to the mode selector 602. Using the input port 622, a preceding mode selector, user-controlled voltage selector, or other control device may be coupled to the demand load shedder device 600 to configure a power controller network. Depending on the mode selector setting in the mode selector 602, the input voltage generated by the digital-to-analog converter 608 may be conducted to the output port 620 of the demand load shedder device 600 to control a ballast or to provide an input signal to a subsequent mode selector. In an alternate mode setting, the control signal received via the input port 622 may be conducted to the output port 620 of the demand load shedder device 600.

Figure 7:
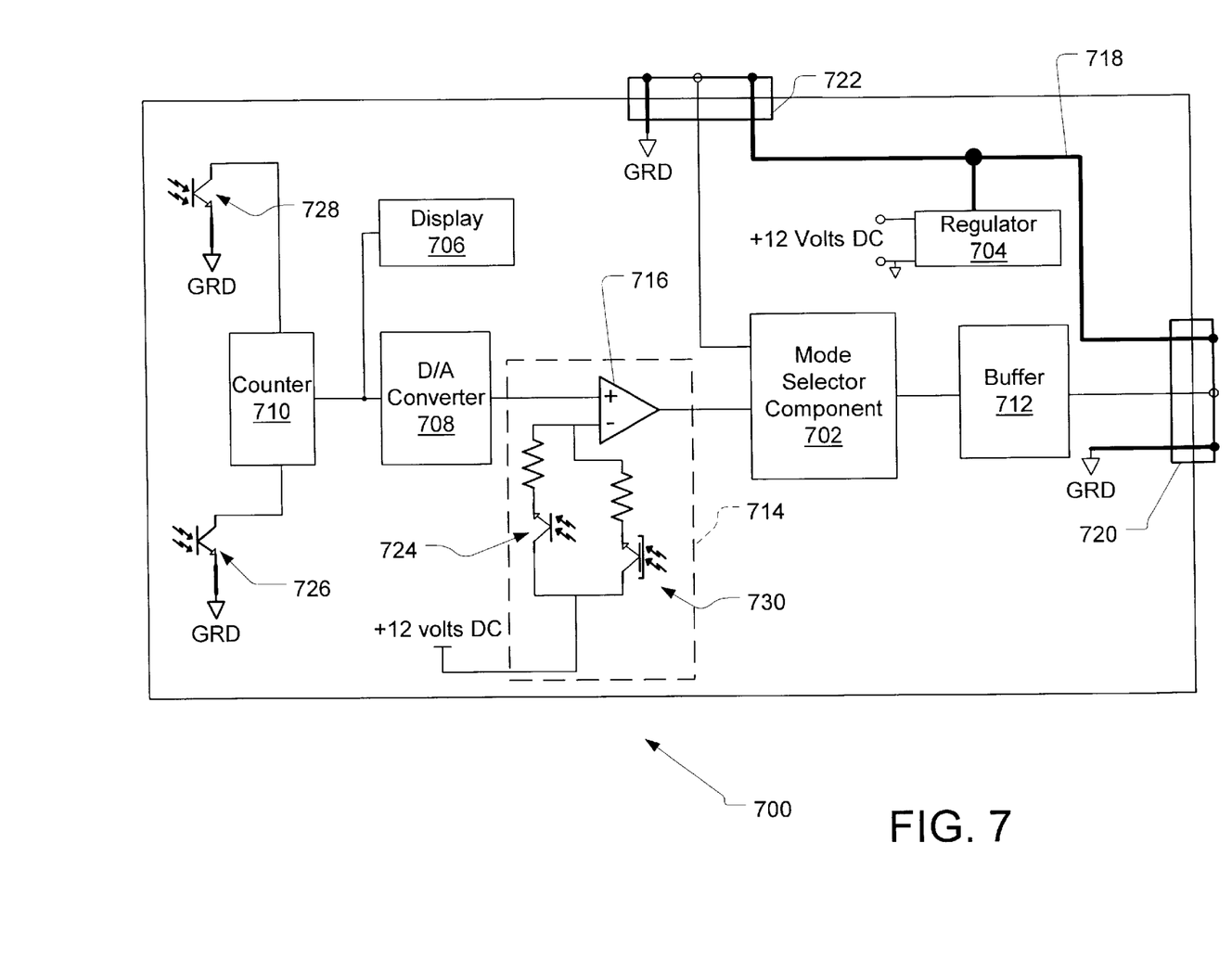
FIG. 7 depicts an exemplary logical representation for an embodiment of the present invention that includes a photometer component.

FIG. 7 depicts an exemplary logical representation for an embodiment of the present invention that includes a photometer component as part of a controlled voltage selector. A laser controlled dimmer device 700 includes a photometer component 714, phototransistors 726 and 728, a digital counter 710, and a digital-to-analog converter 708. A buffer 712 amplifies and isolates the output signal of the mode selector 702 to satisfy the signaling protocol and to drive a subsequent power controller ballast.

The logic within the laser controlled dimmer device 700 is powered by internal source voltage output from a regulator 704, which receives current from a power bus 718. Phototransistors 726 and 728 are adapted to receive illumination by a laser or other light source. The counter 710 counts up or down depending on which phototransistor 726 and 728 is turned on. The digital-to-analog converter 708 converts the count to an analog voltage signal (e.g., 0 to 12 volts DC). The output of the digital-to-analog converter is fed to an error amplifier 716.

The photometer component 714 may include two phototransistors 724 and phototransistor 730 to provide an analog voltage to the terminal of an error amplifier 716. The phototransistor 724 monitors the ambient light around the laser controlled dimmer device 700. The phototransistor 730 that is masked from receiving light monitors the ambient temperature around the laser controlled dimmer device 700. The output of the photometer component 714 monitors the ambient illumination of a given area and produces an analog voltage, which is also fed into the error amplifier 716. The resulting voltage from the error amplifier 716 is the difference between the voltage signal level from the digital-to-analog converter 708, which sets a reference voltage, and the output voltage of the phototransistor circuits. The output of the error amplifier 716 is provided as an analog input signal to the mode selector 702.

An input port 722 is adapted to receive a second input signal to a mode selector 702. Using the input port 722, a preceding mode selector, user-controlled voltage selector, or other control device, may be coupled to the laser controlled dimmer device 700 to configure a power controller network. Depending on the mode selector setting in the mode selector 702, the input voltage generated by the error amplifier 716 may be conducted to the output port 720 of the laser controlled dimmer 700 to control ballast or to provide an input signal to a subsequent mode selector. In an alternative mode setting, the control signal received by the input port 722 may be conducted to the output port 720 of the laser controlled dimmer device 700.

One application of a laser controlled dimmer device allows a building operator to manipulate the dimmer device from a considerable distance. For example, a conventional low powered laser beam may be directed by a building operator to excite one of the phototransistors 726 or 728. This control method is useful to control a laser controlled dimmer device that is mounted on a high ceiling or on some other location to which physical access is limited or inconvenient. Furthermore, the photometer component 714 acts as an ambient light harvester (or "daylight harvester") that will automatically adjust the output signal of the error amplifier 716 in accordance with the referenced voltage signal provided from the digital-to-analog converter 708 to provide more or less light as needed, depending on the ambient light level of the illumination area. A display component 706 may display useful information, such as the relative illumination level, the reference voltage level, the ambient light level, and/or an indication that a laser light is being detected by one of the transistors 726 and 728.

Figure 8:
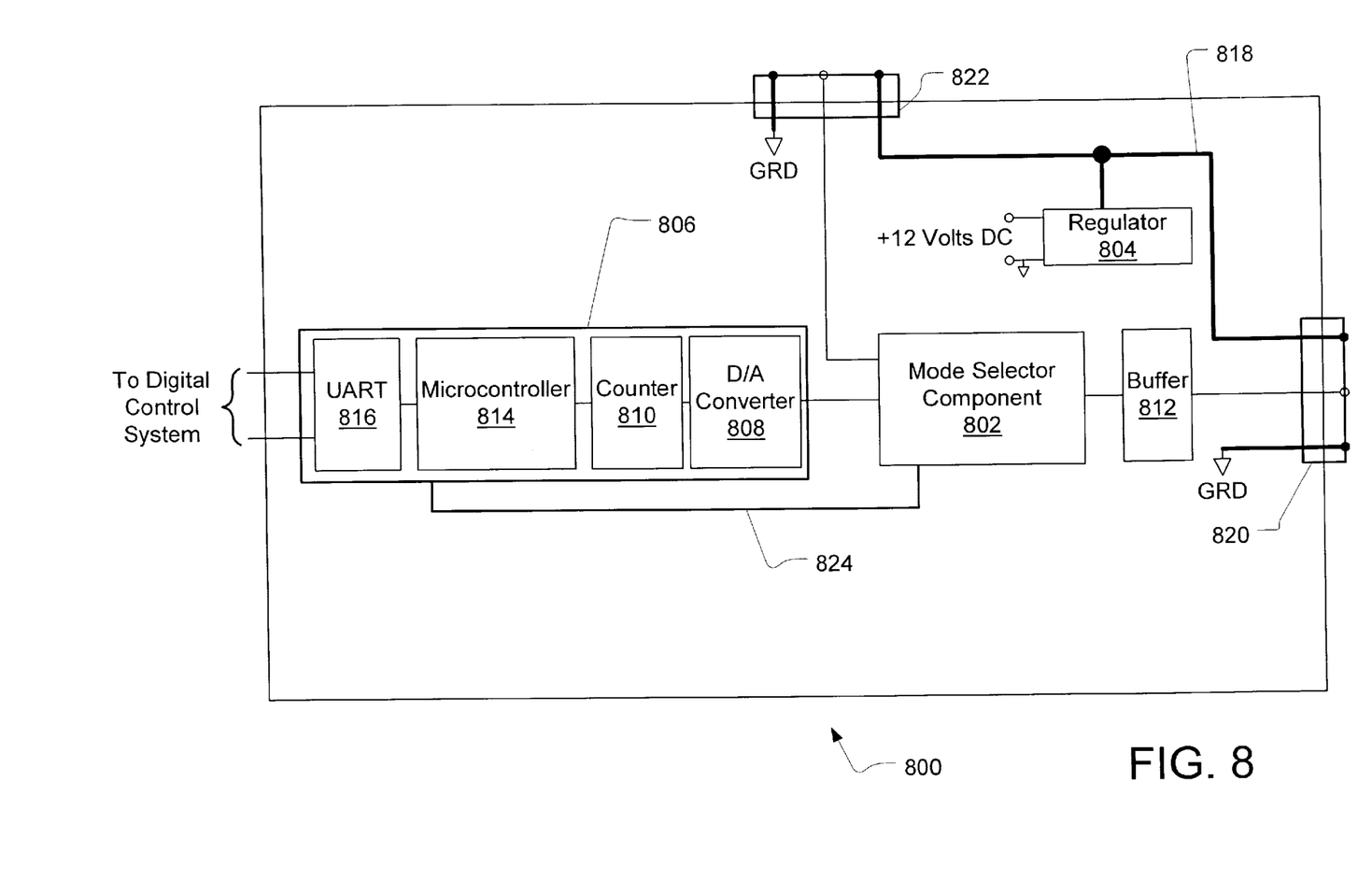
FIG. 8 depicts an exemplary logical representation for an embodiment of the present invention that includes a communications interface.

FIG. 8 depicts an exemplary logical representation for an embodiment of the present invention that includes a communications interface as a controlled voltage selector. A communications interface device 800 includes a communications interface component 806, and a mode selector 802. A buffer 812 amplifies and isolates the output signal of the mode selector 802 to satisfy the signaling protocol and to drive a subsequent power controller or ballast. The logic within the communications interface device 800 is powered by internal source voltage output from a regulator 804, which receives current from a power bus 818. The input signal to the communications interface component 806 satisfies a digital communications protocol in an embodiment to the present invention. The communications protocol includes digital command signals designed to allow at least one of the following: (1) On/off control of downstream, i.e., subsequent, devices; (2) dimming of the downstream devices; and (3) generation of a status signal from the devices downstream. In an embodiment of the present invention, a digital control signal includes an address (or identifier) and a digital value representing a voltage level.

In an embodiment to the present invention, the communications interface device 800 is individually addressable. A microcontroller 814 may be set to accept at least one of 65000 unique addresses. In alternative embodiments, other addressing means and a different number of unique addresses is contemplated within the scope of the present invention. Using addressing, individual ballasts or zones may be controlled from a master digital controller, such as a computer or dedicated control unit.

A UART (Universal Asynchronous Receiver-Transmitter) 816 handles asynchronous serial communications of digital commands from the master digital controller. The output of the UART is received by the microcontroller 814, which determines whether the digital command signal received from the digital control system was intended for the given communications interface device, in accordance with its address setting. The counter 810 counts up or down, according to the digital input signal. The output of the counter is set to a digital-to-analog converter, where an analog voltage of 0 to 12 volts DC is generated. Note that alternative analog signaling protocols are contemplated within the scope of the present invention. Furthermore, in alternative embodiments of the present invention, the addressability of communications interface devices may be omitted without departing from the scope of the present invention.

In yet another embodiment of the present invention, a digital signal on signal line 824 may be sent directly to the mode selector 802 to control the mode selector or to provide an alternate input signal. In such an embodiment, the mode selector 802 includes its own digital-to-analog converter logic to couple into the mode selector circuitry.

An input port 822 is adapted to receive a second input signal to the mode selector 802. Using the input port 822, a preceding mode selector, user-controlled voltage selector, or other control device may be coupled to the communications interface device 800 to configure a power controller network. Depending on the mode selector setting in the mode selector 802, the input voltage generated by the digital-to-analog converter 808 may be conducted to the output port 820 of the communications interface device 800 to control a ballast or to provide an input signal to a subsequent mode selector. In an alternate mode setting, the control signal received via the input port 822 may be conducted to the output port 820 of the communications interface device 800.

In another embodiment of the invention, the power controller might simply be a micro-controller to digitally perform the various operations discussed in all the above embodiments for the power controllers. The micro-controller would have at least some working memory, a non-volatile memory to store program instructions for the operations to be performed, an input/output port and a system bus to connect these components. The input signal lines would be connected from the first and second input ports of the power controller to analog-to-digital (A/D) converters. The control signals as digital output of the AID converters would be passed to I/O port of the micro-controller. The micro-processor is programmed to perform the various operations in the above embodiments. The digital control signal computed by the microprocessor would be passed to a digital-to-analog converter to produce the output analog control signal for the output port of the power controller. The mode input may be a local digital switch input to the microprocessor or a separate digital input through the input/output port of the microprocessor.

Figure 9:
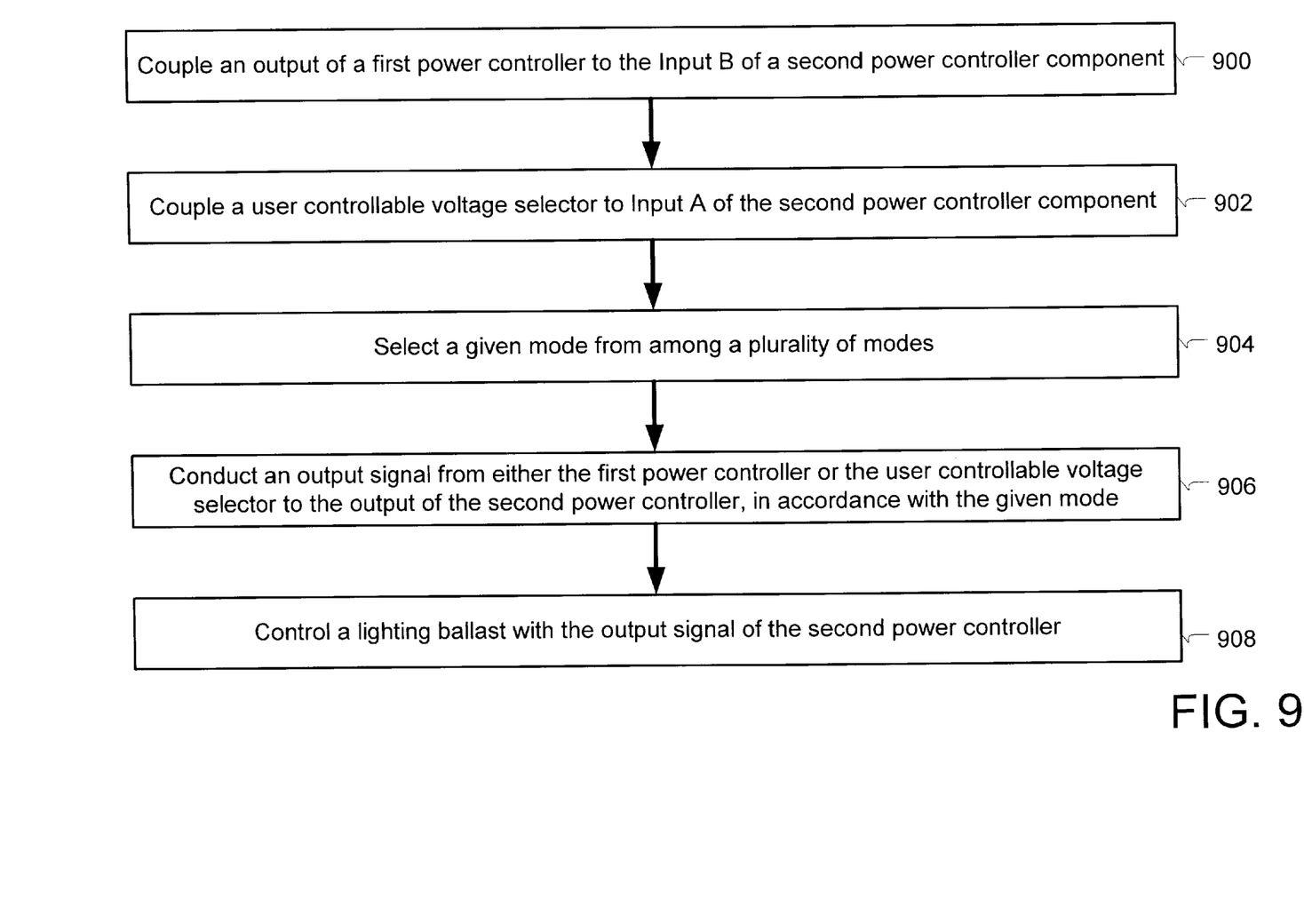
FIG. 9 illustrates a flow diagram for networking a power controller that controls at least one ballast driving a lighting device.

FIG. 9 illustrates a flow diagram for networking a power controller that controls at least one ballast driving a lighting device. In coupling operation 900, the output of a first power controller is coupled to one of the input of a second power controller to provide a power controller network. The input and output signals of the power controllers are compatible (i.e., satisfy the same signaling protocol) so that a control signal output from the first power controller can be used as an input signal of the second power controller. Furthermore, the signaling protocol is preferably designed to control a lighting ballast, although other signaling protocols are contemplated within the scope of the present invention.

In coupling operation 902, a user controlled voltage selection device is coupled to another input of the power controller. As discussed, a user-controlled voltage selection device may include without limitation a rotary dimmer control, a digital slide dimmer control, a keypad, a demand load shedder, a laser-controlled dimmer device, a photometer, and a communications interface to a digital controller.

Operation 904 selects one mode of a plurality of selection modes, wherein the modes determine which input signal is to be conducted to the output of the power controller. Each mode is associated with a criterion, such as "Input A is conducted to Output", "Input B is conducted to Output", "The higher level input signal is conducted to Output", "The lower level input signal is conducted to Output". Other criteria are also contemplated within the scope of the present invention. Operation 906 conducts the appropriate input signal to the output port in accordance with the selected mode. Operation 908 controls a lighting ballast with the output control signal, such as to decrease or increase the illumination of the gas discharge lamp.

The embodiments of the invention described herein are implemented as logical steps in one or more computer systems. The logical operations of the present invention are implemented (1) as a sequence of processor-implemented steps or program modules executing in one or more computer systems and (2) as interconnected machine modules or logic modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of embodiments of the invention. Since many embodiments of the invention can be made without departing from the spirit and scope of the invention, the invention resides in the claims hereinafter appended.

I claim:

1. A lighting controller for controlling at least one ballast driving a lighting device, the lighting controller comprising:

an output signal line adapted to output an output signal satisfying a signaling protocol, the signaling protocol defining a control signal for controlling an amount of power provided to the lighting device by the ballast;

a first input signal line adapted to receive a first input signal satisfying the signaling protocol;

a second input signal line adapted to receive a second input signal satisfying the signaling protocol;

a mode selector selecting among a plurality of modes, each mode determining which of the first input signal and the second input signal are conducted to the output signal line to control the ballast;

an output port for the output signal line;

an input port for each input signal line;

a power bus for transferring power between each of the ports in the lighting controller;

the output port including a first pair of power bus leads coupled to the power bus and the output signal line, the first pair of power bus leads including a power lead and a ground lead; and the input port including a second pair of power bus leads coupled to the power bus and one of the first input signal line and the second input signal line, the second pair of power bus leads including a power lead and a ground lead.

2. The lighting controller of claim 1 wherein the power bus leads of the output port are coupled to an auxiliary power output from the ballast.

3. The lighting controller of claim 2 wherein the auxiliary power output from the ballast is coupled to a winding in a power factor circuit of the ballast.

4. The lighting controller of claim 2 as a first lighting controller wherein power is transferred from the first lighting controller to another lighting controller having any port coupled to a port of the first lighting controller.

5. The lighting controller of claim 1 as a first lighting controller, wherein first input signal includes a control signal and the first input port is adapted to couple to the output port of another lighting controller and to transfer the control signal from the additional lighting controller to the first lighting controller.

6. The lighting controller of claim 5 wherein the power provided from the lighting controller is derived from current generated by a power factor circuit of the ballast and is cascaded to the first additional lighting controller via the power bus and the first input port.

7. The lighting controller of claim 1 wherein a first current generated by a power factor circuit of the ballast and a second current generated by a power factor circuit of another ballast are applied in parallel to power the lighting controller.

8. A power controller for controlling at least one driver circuit driving a building automation device, the power controller comprising:

an output signal line adapted to output an output signal satisfying a signaling protocol, the signaling protocol defining a control signal for controlling an amount of power provided to the building control device by the driver circuit;

a first input signal line adapted to receive a first input signal satisfying the signaling protocol;

a second input signal line adapted to receive a second input signal satisfying the signaling protocol;

a mode selector selecting among a plurality of modes, each mode determining which of the first input signal and the second input signal are conducted to the output signal line to control the driver circuit;

an output port for the output signal line;

an input port for each input signal line;

a power bus for transferring power between each of the ports in the power controller;

the output port including a first pair of power bus leads coupled to the power bus and the output signal line, the first pair of power bus leads including a power lead and a ground lead; and the input port including a second pair of power bus leads coupled to the power bus and one of the first input signal line and the second input signal line, the second pair of power bus leads including a power lead and a ground lead.

9. The power controller of claim 8 wherein the power bus leads of the output port are coupled to an auxiliary power output from the circuit.

10. The power controller of claim 9 as a first power controller wherein power is transferred from the first power controller to another power controller having any port coupled to a port of the first power controller.

11. The power controller of claim 8 as a first power controller, wherein first input signal includes a control signal and the first input port is adapted to couple to the output port of another power controller and to transfer the control signal from the additional power controller to the first power controller.

12. The power controller of claim 11 wherein the power provided from the power controller is derived from current generated by a power factor circuit of the driver circuit and is cascaded to the first additional power controller via the power bus and the first input port.

13. A method for networking a power controller that controls at least one driver circuit driving a building automation control device, the power controller including an output signal line adapted to output an output signal, a first input signal line adapted to receive a first input signal, a second input signal line adapted to receive a second input signal, wherein the output signal, the first input signal, and the second input signal satisfy the same signaling protocol that defines a control signal for controlling an amount of power provided to the building automation control device by the driver circuit, the method comprising:

coupling an output of an additional power controller to the first input signal line of the power controller;

coupling a user controllable voltage selector to the second input signal line of the power controller; and selecting a given mode among a plurality of modes, each mode determining which of the first input signal and the second input signal are conducted to the output signal line.

14. The method of claim 13 further comprising:

powering the lighting controller using current derived from a ballast.

15. The method of claim 13 wherein the operation of selecting a given mode comprises:

selecting the given mode to cause the one of the first input signal and the second input signal having a higher signal level to be conducted to the output signal line.

16. The method of claim 13 wherein the operation of selecting a given mode comprises:

selecting the given mode to cause the one of the first input signal and the second input signal having a lower signal level to be conducted to the output signal line.

* * * * *